United States Patent
Fetzer et al.

(10) Patent No.: US 7,087,884 B2
(45) Date of Patent: Aug. 8, 2006

(54) LIGHT BARRIER OR LIGHT GRID WITH ALIGNMENT MECHANISM

(75) Inventors: Guenter Fetzer, Gundelfingen (DE); Daniel Rieger, Freiburg (DE); Martin Wuestefeld, Sexau (DE)

(73) Assignee: Sick AG, Waldkirch (DE)

( * ) Notice: Subject to any disclaimer, the term of this patent is extended or adjusted under 35 U.S.C. 154(b) by 0 days.

(21) Appl. No.: 11/060,245

(22) Filed: Feb. 16, 2005

(65) Prior Publication Data

US 2005/0184225 A1    Aug. 25, 2005

(30) Foreign Application Priority Data

Feb. 19, 2004    (DE) .................... 10 2004 008 059

(51) Int. Cl.
- *H01J 40/14*    (2006.01)
- *G08B 13/18*    (2006.01)
- *G01C 1/00*    (2006.01)

(52) U.S. Cl. .................... 250/221; 356/556; 340/152.1
(58) Field of Classification Search ................ 250/221, 250/225; 340/555, 556, 557; 356/152.1, 356/153, 141.1
See application file for complete search history.

(56) References Cited

U.S. PATENT DOCUMENTS

| 3,752,978 A | 8/1973 | Kahl, Jr. et al. |
| 5,786,889 A * | 7/1998 | Pope et al. .............. 356/152.1 |
| 6,124,586 A * | 9/2000 | De Coi ....................... 250/221 |
| 2002/0024713 A1* | 2/2002 | Roberts et al. ............. 359/267 |
| 2002/0027208 A1* | 3/2002 | Haque et al. .......... 250/559.36 |

FOREIGN PATENT DOCUMENTS

| DE | 20317622 U1 | 3/2004 |
| EP | 0889332 B1 | 1/1999 |

* cited by examiner

*Primary Examiner*—Georgia Epps
*Assistant Examiner*—Brian Livedalen
(74) *Attorney, Agent, or Firm*—Townsend and Townsend and Crew

(57) ABSTRACT

A light barrier or light grid which has at least one light emitter arranged in a first housing and at least one associated light receiver arranged in a second housing. At least one emitter of visible alignment light installed in the first or the second housing generates one or more alignment light beams which is used to geometrically orient the light emitter relative to the opposite light receiver. For optically aligning the two housings, at least one alignment mechanism is present in the housing which receives the alignment beam. The alignment mechanism has at least one surface which optically deflects the alignment beam towards a target plane.

9 Claims, 2 Drawing Sheets

LIGHT BARRIER OR LIGHT GRID WITH ALIGNMENT MECHANISM

BACKGROUND OF THE INVENTION

The invention concerns a light barrier or a light grid having a light emitter and a spaced-apart light receiver with an alignment beam between them for mutually aligning the emitter and receiver.

Such light barriers or light grids are used to monitor access zones, for example, in the vicinity of dangerous machine tools.

A light barrier has a single light emitter and a single light receiver which protect the access zone with a light beam that crosses the access zone. A light grid has several light emitters and receivers that generate several light beams which are set off and parallel to each other and cross the access zone. In this application the term "light barrier" is used to refer to both a light beam and a light grid unless otherwise indicated.

Further, the word "light" is not confined to visible light and is intended to generally refer to those electromagnetic rays, from UV light through the visible range to IR light, that are normally used for the operation of light barriers and light grids.

The light barriers described herein use the single-path principle. The light emitter (for light barriers) or emitters (for light grids) are installed in a first housing and the light receiver or receivers in a second housing. In order for the light emitters on one side of the monitored access zone to properly cooperate with the light receivers on the other side of the access zone, it is necessary to mutually align the two housings with respect to each other. For this, they must be linearly shifted, rotated or tilted, as needed.

It is known to use alignment aids for aligning these housings. Especially when the distance between light emitter and receiver is great, the housings can be aligned with a permanently installed or an externally positioned, adaptable sighting telescope. It is also known to align the emitter and receiver with the help of the actual light signal of the light barrier. In this method, the orientation of the light emitter and the light receiver is changed until the received signal has reached a maximum value. For this, it is known, for example, to vary the blinking frequency of a display diode as a function of the strength of the reception signal, or to generate an acoustic signal, for example.

Another mechanism for aligning the two housings is known from published European patent application EP 0 889 332 B1. In this publication, a method and a device are disclosed in which an alignment light emitter is located in each housing for sending out an alignment light beam. Alternatively, a second alignment beam can be generated from the first alignment beam with several, precisely adjusted deflection mirrors.

Drawbacks in the known method of aligning light barriers are the cost associated with the sighting telescope solution and the space which it requires. In the solution making use of the received signal beam, the time that is required for aligning the emitter and receiver is quite high.

A drawback for the alignment aid disclosed in EP 0 889 332 B1 is that the mutual geometrical orientation of the two housings necessitates that the opposite housing always be visible to carry out the alignment. This can lead to problems, especially when the distances are large and there are high levels of relatively bright ambient light. This type of alignment aid is especially difficult when the light barriers are guided by deflection mirrors through an angular access zone.

Furthermore, such an alignment aid is relatively expensive due to the fact that an alignment light emitter has to be installed and operated in each housing, or because several exactly adjusted deflection mirrors are required. Moreover, much time is needed to achieve the desired alignment.

SUMMARY OF THE INVENTION

It is an object of the present invention to provide a light barrier or grid of the kind mentioned above with an alignment aid which entails only slight manufacturing costs, which does not increase the size of the light barrier or grid, and which can be easily used even when the distance between the two housings is large and/or deflection mirrors are used in the access zone.

According to the present invention, at least one alignment device or mechanism is provided for geometrically orienting a second housing, which is situated opposite a first housing that emits an alignment beam. The alignment mechanism has at least one surface that optically deflects the alignment beam and one target surface used for aligning the optical axes of the light emitter and the light receiver with respect to each other.

An advantage of this alignment mechanism in the second housing is that it allows the optical axes of the light emitter/receiver in the second housing to be precisely aligned relative to the first housing. The alignment mechanism indicates the alignment status of the second housing directly on or in the second housing. For aligning the two housings, it is therefore not necessary that the first housing be visible from the second housing. Since the integrated alignment mechanism comprises only a surface for deflecting the alignment beam, space requirements and the associated production costs are very low.

In one advantageous embodiment of the invention, a target plate for the incoming alignment beam is arranged at an angle of ca. 45° to a light entry surface of the housing. In this way, the target plate inside the housing can be viewed by the person performing the alignment operation over a relatively wide viewing angle.

Another embodiment of the invention seeks to minimize costs by placing the target plate inside the housing on the bottom thereof. This embodiment performs the function of the target plate with simple contrast markings on the bottom of the housing. When the housing is injection molded or is otherwise molded of plastic, for example, the contrast markings can be incorporated in the molding dies. In this manner there are no additional costs for producing a separate target plate and installing it in the housing.

In one particularly advantageous configuration of the target plate, ring- and/or cross-shaped lines are arranged on the target plate about the desired nominal target point. This facilitates the alignment process because the target point onto which the alignment beam must be trained is very conspicuous.

In another expedient embodiment, the alignment mechanism extends essentially along the axis of the housing, which is perpendicular to the incident alignment beam. This embodiment has the major advantage, especially in conjunction with light grids, that the length of the housing, which is dictated by the configuration of the light grid, can be used to create a relatively long optical path for the alignment beam between the deflection surface or mirror and the target plate. In this embodiment, the alignment beam acts like a long optical pointer, which substantially enhances the display accuracy of the alignment mechanism.

In a modification of the invention, the deflection mirror and the target plate of the alignment mechanism take the form of an optically transparent prism. The prism, which in terms of its optically active surfaces has the shape of a half-cube, has the major advantage that no adjustment of the deflection mirror and the target plate relative to each other is needed because both are defined by the shape of the prism. Likewise, an adjustment of this alignment mechanism is very simple because only the base surface of the prism has to be oriented parallel to the housing surface on which the incoming alignment beam is incident.

For a number of reasons, it is especially advantageous to arrange the alignment mechanism inside the housing. In this case, however, the alignment beam must penetrate into the housing, and the target plate must be visible from outside the housing. This requires corresponding windows in the housing. Since light barrier housings are often used under harsh surrounding conditions and require a high degree of protection, it is necessary for all optical windows to be fully sealed when installed in the housing. This entails substantial additional costs for each additional window.

In a further modification of the invention, therefore, a single closure plate is installed in the housing. The closure plate allows entry of the alignment beam into the housing and permits observing the impact point of the beam on the target plate. This has the benefit that the manufacturing costs of the housing and the installation of the alignment mechanism are, at most, only nominally increased.

In a still further modification of the invention, the target plate has the shape of a two-dimensional, position-resolving reception element. This permits a visual observation of the impact point of the reflected alignment beam while making it possible to also generate a numerical display, for example, of the impact position. In this manner, the accuracy of the alignment mechanism can be significantly enhanced.

DESCRIPTION OF THE PREFERRED EMBODIMENTS

Figure 1:
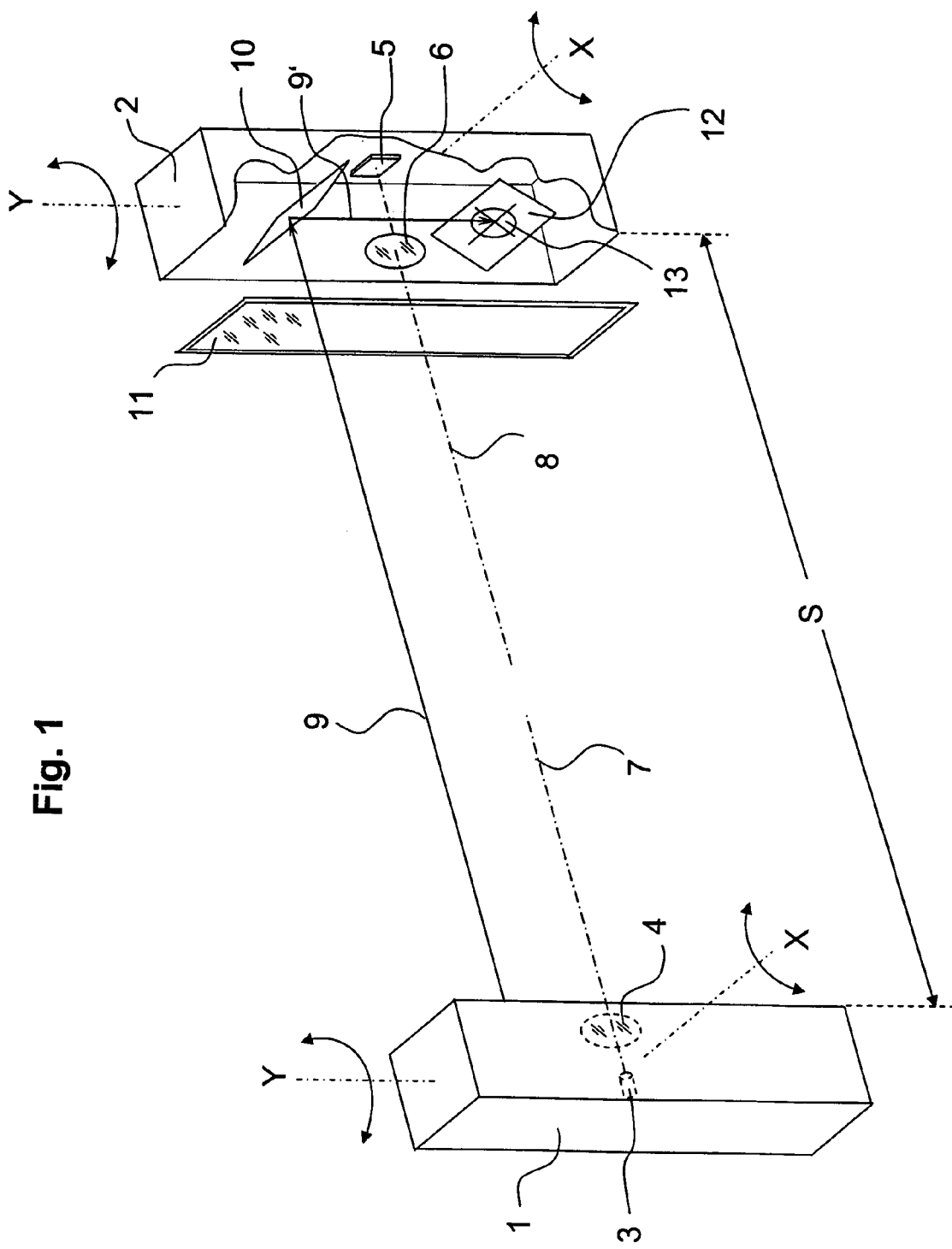
FIG. 1 is a perspective representation of a light barrier having a first housing emitting an alignment beam and a second housing with an alignment mechanism.

Referring to FIG. 1, a light barrier constructed in accordance with the present invention has a first housing 1 and a second housing 2. A light emitter having a light source 3 and a transmission optic 4 is installed in the first housing. A corresponding light receiver having a light-sensitive element 5 and a reception optics 6 is installed in second housing 2. The optical axis 7 of the light emitter as well as an optical axis 8 of the light receiver are accurately adjusted inside the respective housings.

An access zone "S" to be monitored lies between first housing 1 and second housing 2. In order for the light emitter to be accurately matched to the light receiver, both housings must be aligned relative to each other. For this, it is necessary to pivot the two housings at least about two axes of rotation "x" and "y" so that a light beam from the light emitter is optimally detected by the light receiver. The two aligned housings are fixed in this position with appropriate mounting means at the installation site.

For aligning the two housing, a readily viewable alignment beam 9, such as a parallel red laser beam, is emitted from first housing 1. During the earlier assembly at the factory, the alignment beam 9 has been oriented in housing 1 so that it exits the housing in precisely the same direction as the light barrier beams. If housing 1 is pivoted about one or both axes of rotation x and y, the direction of the alignment beam 9 and of optical axis 7 of the light emitter identically changes their directions. This, in turn, means that when alignment beam 9 impinges exactly on the center of a deflection mirror 10 installed in second housing 2, housing 1 and therefore also the light emitter are in correct alignment relative to housing 2.

The optical axis 8 of housing 2 is next adjusted so that it is in precise alignment with optical axis 7 of the first housing by appropriately pivoting the second housing about its axes of rotation x and y. For this purpose, an alignment mechanism defined by a deflection mirror 10 and a target plate 12 is arranged behind a closure plate. As is shown in FIG. 1, deflection mirror 10 behind closure plate 11 is arranged at an angle of 45°. The incoming orienting beam 9 is deflected by mirror 10 and continues as alignment beam 9' in the housing 2 to target plate 12. In the sample embodiment of FIG. 1, the target plate 12 is also arranged at an angle of approximately 45° to optical axis 8. The surface of the target plate 12 is configured so that the incident alignment beam 9' is diffusely scattered by the plate. In this way, the place where alignment beam 9' impinges on target disk 12 can be accurately identified.

As already mentioned, deflection mirror 10 is arranged at an angle of 45° behind closure plate 11. This means that the incident orienting beam 9 is deflected by exactly 90° at deflection mirror 10 when alignment beam 9 impinges on closure plate 11 exactly at a right angle. Since the target plate 12 is placed inside the alignment mechanism in a precise geometrical correlation, alignment beam 9' deflected by mirror 10 will strike the precise center of target plate 12 when alignment beam 9 strikes closure plate 11 exactly at a right angle. Closure plate 11, which for the purpose of better illustration is shown in FIG. 1 at a slight distance from housing 2, closes housing 2 at its light entry side. At the same time, closure plate 11 is dimensioned so that both the light beam of the light barrier and the alignment beam 9 enter the housing 2 without hindrance, and the person performing the alignment has an unimpeded view of target plate 12 when orienting and setting up the light barrier. The center of the target plate 12, i.e. the nominal target point at which the reflected alignment beam 9' must be directed, is marked, for example, by lines 13 arranged in the form of a ring and/or a cross.

Figure 2:
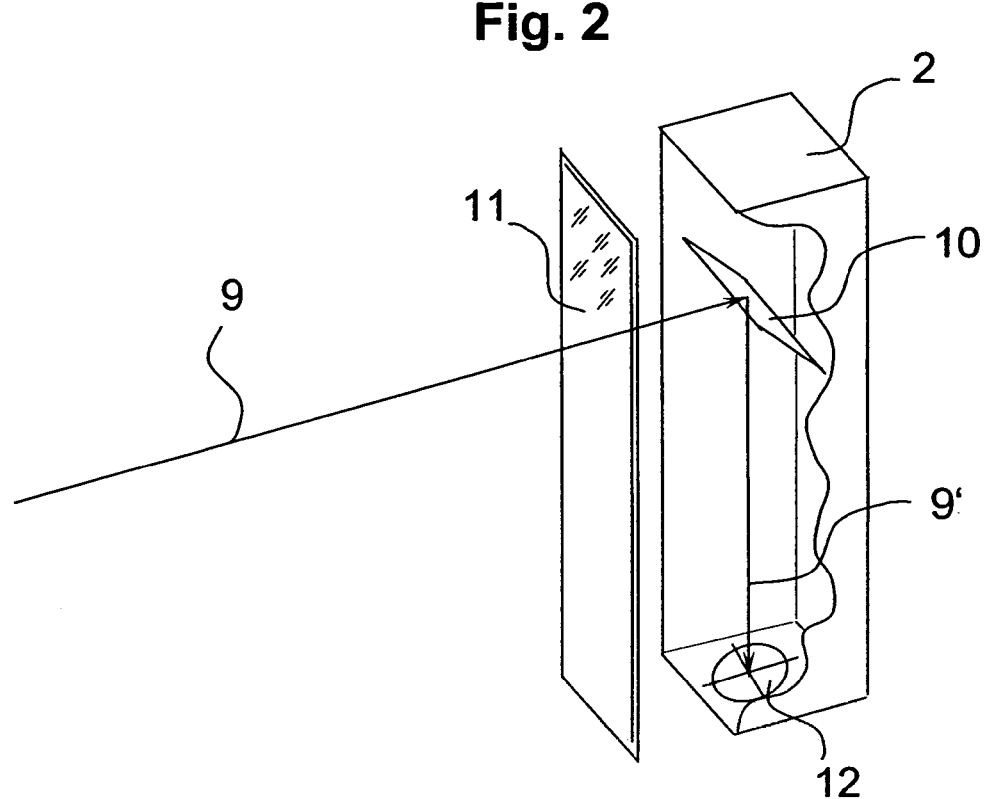
FIG. 2 is a perspective view of an alignment mechanism with a deflection mirror and a target plate arranged on the bottom of the housing.

In another embodiment of the alignment mechanism shown in FIG. 2, target plate 12 is arranged on the inside surface of the bottom of the housing 2. This is a very economical embodiment because the function of target plate 12 can be replaced by a simple contrast marking in the housing bottom. If housing 2 is made, for example, by injection molding or plastic molding, the contrast marking can be incorporated in the die molding so that virtually no additional costs are encountered for providing target plate 12 of the alignment mechanism.

Figure 3:
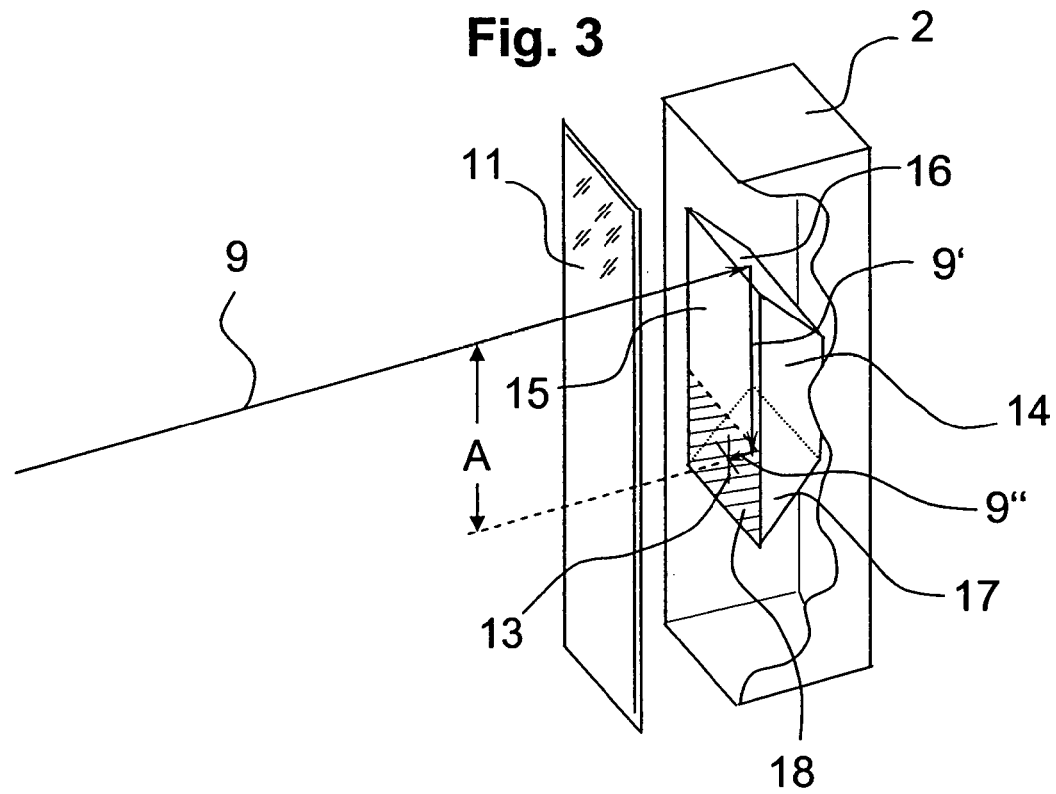
FIG. 3 is a perspective view of an alignment mechanism in which the deflection mirror and the target plate are formed by a prism.

A further embodiment of the alignment mechanism of the present invention is shown in FIG. 3. Here, the functions of deflection mirror 10 and target plate 12 are performed by an optical prism 14. The alignment beam 9 enters prism 14 through its base surface 15, which is parallel to closure plate 11. Since alignment beam 9 strikes base surface 15 perpendicularly, the alignment beam 9 is not deflected and strikes a first outer surface 16 of the prism tilted by an angle of 45° relative to base surface 15. Since the prism is made from an optical material with an index of refraction n of around 1.5, alignment beam 9 is deflected by a total deflection angle of 90°. The deflected alignment beam 9' then strikes a second outer surface 17 of the prism, which is at an angle of 90° relative to first outer surface 16. At second outer surface 17, the alignment beam 9' is again deflected in another total reflection of 90°. Accordingly, the further deflected alignment beam 9" is deflected relative to the original incoming beam 9 by 180°, and it again strikes base surface 15 but is displaced by the distance "A" relative to incoming beam 9. The base surface 15 of prism 14 is not polished in a region 18 where double deflected alignment beam 9" strikes it. Instead, region 18 has a frosted surface, comparable to a frosted glass pane surface. The frosted surface causes a scattering of alignment beam 9" which makes the point of impact quite conspicuous. Frosted region 18 performs the function of target plate 12. Here as well, frosted region 18 is preferably constructed so that the nominal point is readily visible, for example, by providing annular and/or cross-shaped target lines 13. By making prism 14 a plastic prism, this embodiment of the present invention provides a very effective and economical alignment mechanism.

What is claimed is:

1. A light barrier comprising a light emitter arranged in a first housing, a light receiver arranged in a second housing operatively coupled with the light emitter, a visible alignment beam emanating from one of the first or second housings for optically aligning the first and second housings, an alignment mechanism in the other one of the first and second housings arranged to be struck by the alignment beam and including a surface which optically deflects the alignment beam, and a target plate, also located in the other one of the first and second housings, arranged to receive the alignment beam from the surface, said target plate having a surface configured so that the alignment beam diffusively scatters when impinging on said target plate.

2. A light barrier according to claim 1 wherein the target plate is arranged at an angle of about 45° to a light entry surface of the other one of the housings.

3. A light barrier according to claim 1 wherein the target plate is on an inside floor of the other one of the housings.

4. A light barrier according to claim 1 wherein the target plate includes annular and/or cross-shaped lines arranged about a nominal target point for the alignment beam.

5. A light barrier according to claim 1 wherein the alignment mechanism extends along an axis of the other one of the housings which is perpendicular to the alignment beam from the one of the housings.

6. A light barrier according to claim 1 wherein the surface which optically deflects the alignment beam and the target plate of the alignment mechanism are formed by an optically transparent prism.

7. A light barrier according to claim 1 including a closure plate for the other one of the housings through which the alignment beam enters the other one of the housings, and through which an impact point of the alignment beam on the target plate can be observed.

8. A light barrier according to claim 1 wherein the target plate is integrally formed on an inside floor of the other one of the housings.

9. A light barrier according to claim 1 wherein the target plate has a shape of a two-dimensional, position-resolving reception element.

\* \* \* \* \*